Nov. 4, 1924.　　　　　　　　　　　　　　　　　　　　　1,514,035
T. K. CUMMINS
DEVICE FOR USE IN BEDSPRINGS
Filed Nov. 6, 1922
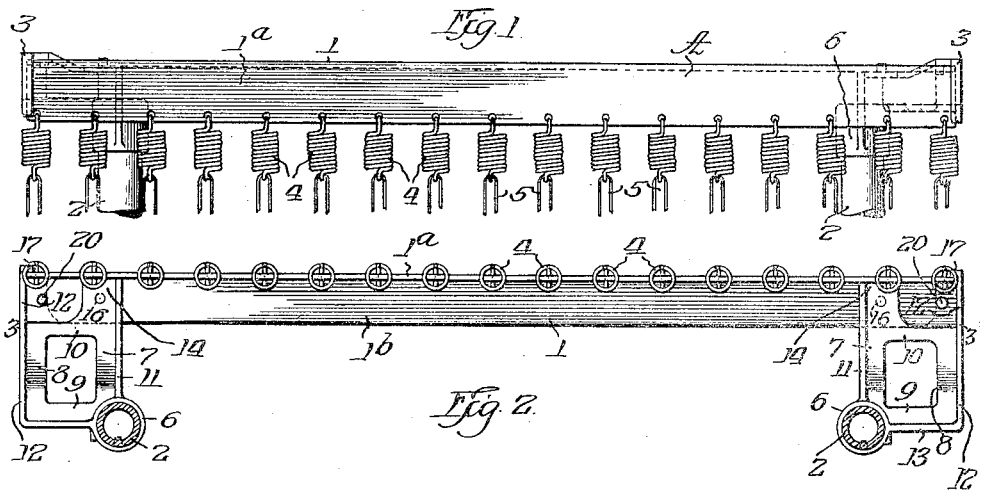
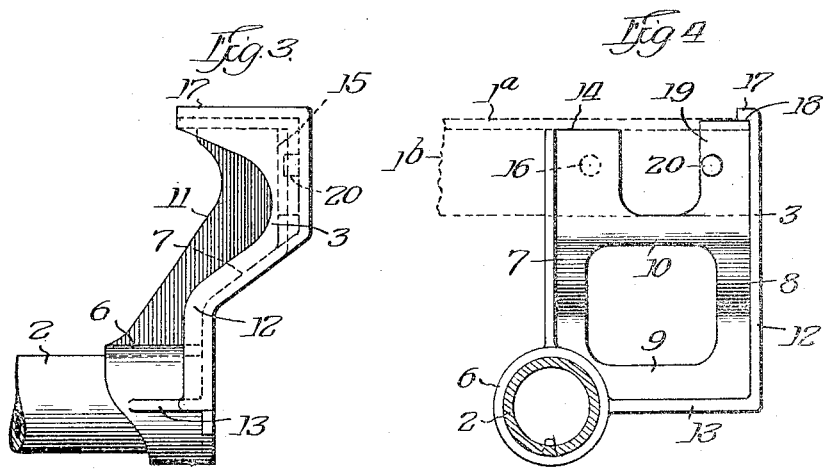
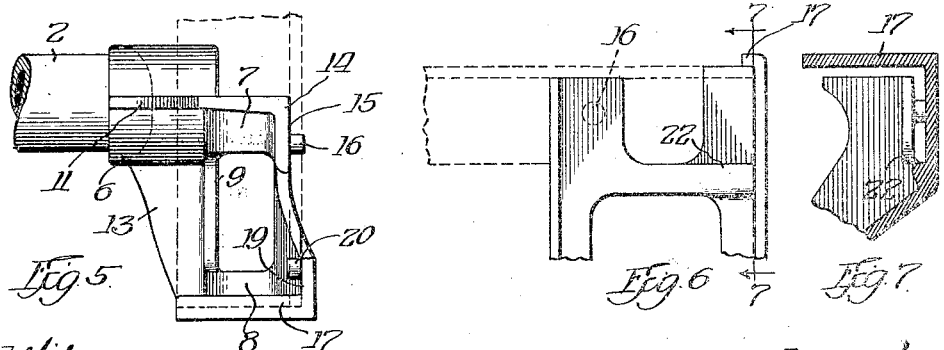

Patented Nov. 4, 1924.

1,514,035

UNITED STATES PATENT OFFICE.

THOMAS K. CUMMINS, OF ST. PAUL, MINNESOTA, ASSIGNOR TO NORTHERN MALLEABLE IRON COMPANY, OF ST. PAUL, MINNESOTA, A PARTNERSHIP.

DEVICE FOR USE IN BEDSPRINGS.

Application filed November 6, 1922. Serial No. 599,208.

*To all whom it may concern:*

Be it known that I, THOMAS K. CUMMINS, a citizen of the United States, residing  St. Paul, in the county of Ramsey and tate of Minnesota, have invented a certain new and useful Improvement in Devices for Use in Bedsprings, of which the following is a full, clear, concise, and exact description, reference being had to the accompanying drawings, forming a part of this specification.

My invention relates to bed springs, and particularly to devices for use therein for connecting and holding the corners of the spring together, sometimes known as the corner pieces or castings of the bed spring.

One of the objects of the invention is to provide a simple and practical device of this character.

Another object of the invention is to provide simple, advantageous and expeditious means for uniting the various parts of the bed spring in a secure and durable manner.

Another object of the invention is to permit the ready assembling of the devices and the other parts of the bed spring.

In the accompanying drawings Fig. 1 is a plan view of a portion of a bed spring embodying my present invention;

Fig. 2 is a view looking edgewise at the construction shown in Fig. 1;

Fig. 3 is a side elevation of the corner device by itself;

Fig. 4 is a view of the interior of the same;

Fig. 5 is a plan view of the device; and

Figs. 6 and 7 are views of a modified form of construction.

Referring to the drawings, I show a portion of a bed spring A comprising an end angle bar 1, braces or supports 2—2, corner pieces 3—3 for supporting the angle bar 1 and helical springs 4—4 connected to the angle bar 1 and also to wires 5—5 forming the wire fabric of the bed spring.

The corner pieces 3—3 containing my present invention, afford especially advantageous and improved means for supporting the end bar 1. Each of said corner pieces 3 involves a socket 6 into which the end of the brace 2 may fit and within which it may be firmly and rigidly and permanently secured. Each corner piece 3 also involves two upwardly extending members 7 and 8 connected at their lower ends by a cross member 9 and at their upper ends by a cross member 10. Members 7, 8 and 9 are preferably provided with strengthening ribs 11, 12 and 13, respectively. The top of member 7 is flat so as to form a shoulder or abutment 14 for the horizontal bar 1ª of the angle bar 1. The back surface 15 of this member is preferably made flat so as to form a shoulder or abutment for the vertical portion or leaf 1ᵇ of the angle bar 1. Preferably a pin 16 projects from the back 15 for engaging a corresponding opening in the vertical leaf 1ᵇ of the angle bar.

The other vertical member 8 has an overhanging lip 17 providing a shoulder 18 for the horizontal member 1ª of the angle bar, and also has a back flange 19 providing a shoulder or abutment in the rear of the vertical leaf 1ᵇ of the angle bar. Preferably a pin 20 is mounted on the flange 19, projecting forwardly from the same and adapted to engage a corresponding opening in the vertical leaf 1ᵇ.

Thus when the angle bar is in position, as shown in Figs. 1 and 2, the vertical leaf 1ᵇ is back of the upper end of member 7 and in front of the upper end of member 8, and the horizontal leaf 1ª is in engagement with pins 16 and 20 and also with the lip or abutment 17. Thus said angle bar is firmly located in position, being held against both horizontal and vertical movement and the tension of the mattress and springs 4—4 simply serves to lock the angle bar more securely and firmly in position with the corner members, it being understood that all four corners of the bed spring are provided with corner pieces 3, two of which are as described and the other two of which are the same in character but reversed.

In using the invention, the members 3—3 are arranged at the ends of the angle iron end bar 1, so that the horizontal flange 1ª engages the shoulder or abutment 14 and its end engages the rib 12 and lip 17, and also so that the vertical flange 1ᵇ engages the shoulder or abutment 15 and the pins 16 and 20, the end of such flange also preferably engaging the rib 12. This assembles and locks the members and then the helical springs 4—4 with wire fabric 5 are attached, making the complete bed spring. The tension of the springs 4 and fabric 5 draws the parts more firmly and securely together and holds them in assembled condition. Tension or drawing action of the springs 4 and fabric 5 pull the vertical flange 1ᵇ against the rearwardly facing shoulder 15, thereby holding the same firmly against disengagement from pins 16 and 20 and a certain amount of leverage tends to force the end of said vertical flange against the forwardly facing abutment or shoulder 19. The upper flange is held by overhanging lip 17 with a certain amount of leverage against the same by reason of abutment or shoulder 14. Thus the device is very firmly and securely locked together when in assembled condition and at the same time assemblage and disassemblage are readily accomplished.

In the modified form shown in Figs. 6 and 7 the pin 20 of the first described form is omitted and a shoulder 22 is preferably provided for the lower edge of the vertical flange 1ᵇ. In this form disengagement of the vertical flange will be permitted by pin 16.

It will be understood that changes and modifications may be made without departing from the spirit of the invention.

What I claim is:

1. A corner piece for bed springs of the character described comprising a single integral casting having a main vertical web having two vertical ribbed web extensions, one at each end of the main web, and staggered so as to engage opposite faces of the vertical flange of the angle bar at non-opposite positions, said vertical web extensions corresponding substantially to the width of the vertical flange and having an aperture between them through which the vertical flange of the angle bar passes so that this flange is on the inside of one web extension and on the outside of the other web extension to brace the angle bar against bending, and means whereby the angle bar is supported against said web extensions.

2. A corner piece for bed springs of the character described comprising a main vertical web having two vertical ribbed web extensions, one at each end of the main web, and staggered so as to engage opposite faces of the vertical flange of the angle bar at non-opposite positions, said vertical web extensions having an aperture between them through which the vertical flange at the angle bar passes so that this flange is on the inside of one web extension and on the outside of the other web extension, means whereby the angle bar is supported against said web extensions, and pin extensions carried by the web extensions adapted to enter holes in the vertical flange of the angle bar from opposite sides.

3. A device of the class specified comprising a strengthened web having separated upright portions, one of which has its top constructed to form an abutment or support for the horizontal flange of the angle bar, and a side to engage the inner face of the vertical flange of the angle bar and the other of which has a portion forming an abutment to engage the back of the end face at the vertical flange, said separated upright portions of the web being upon opposite sides of the vertical flange of the angle bar at non-opposite positions along the flange, and is also provided with a projection or lip overhanging the top of the end of the horizontal flange and forming an abutment for the same.

4. A device of the class specified comprising a web having two upright portions both of which are ribbed, one of which portions with its rib is adapted to form a supporting abutment for the horizontal flange of the angle bar and is provided with an outwardly extending projection or pin to engage an aperture in the vertical flange of the angle bar, the other of said upright portions forming an abutment for the end of the vertical flange of the angle bar and being provided with an inwardly extending pin to engage an aperture in said vertical flange, the rib of said last mentioned web portion being provided with an overhanging rib or flange adapted to rest upon and form an abutment for engaging the upper surface of the end of the horizontal flange of the angle bar.

In witness whereof, I hereunto subscribe my name this third day of October A. D., 1922.

THOMAS K. CUMMINS.

Certificate of Correction.

It is hereby certified that in Letters Patent No. 1,514,035, granted November 4, 1924, upon the application of Thomas K. Cummins, of St. Paul, Minnesota, for an improvement in "Devices for Use in Bedsprings," errors appear in the printed specification requiring correction as follows: Page 2, line 70, claim 3, strike out the words "of the end face at the" and insert instead *face at the end of the;* same page and claim, line 71, strike out the comma and words ", said separated upright portions of the web being upon opposite sides of the vertical flange of the angle bar at non opposite positions along the flange" and insert the same to follow after the word "same," line 78, same claim; and that the said Letters Patent should be read with these corrections therein that the same may conform to the record of the case in the Patent Office.

Signed and sealed this 16th day of June, A. D. 1925.

[SEAL.] 
KARL FENNING,
*Acting Commissioner of Patents.*